United States Patent
Hashimoto (10) Patent No.: US 8,890,976 B2
(45) Date of Patent: Nov. 18, 2014

(54) IMAGING APPARATUS AND IMAGE CAPTURING METHOD FOR INCREASING SECURITY OF A CAPTURED IMAGE FILE

(75) Inventor: Tetsuya Hashimoto, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 465 days.

(21) Appl. No.: 13/190,866

(22) Filed: Jul. 26, 2011

(65) Prior Publication Data
US 2012/0026362 A1   Feb. 2, 2012

(30) Foreign Application Priority Data
Aug. 2, 2010   (JP) .................................. 2010-173405

(51) Int. Cl.
| | |
|---|---|
| *H04N 5/76* | (2006.01) |
| *G11B 20/00* | (2006.01) |
| *H04N 5/77* | (2006.01) |
| *H04N 5/445* | (2011.01) |
| *H04N 1/44* | (2006.01) |
| *H04N 1/21* | (2006.01) |
| *H04N 5/228* | (2006.01) |
| *H04N 5/232* | (2006.01) |
| *H04N 101/00* | (2006.01) |

(52) U.S. Cl.
CPC .................. *H04N 5/77* (2013.01); *H04N 5/232* (2013.01); *G11B 20/00666* (2013.01); *H04N 2201/218* (2013.01); *G11B 20/00673* (2013.01); *G11B 20/00152* (2013.01); *H04N 5/44543* (2013.01); *H04N 1/4413* (2013.01); *H04N 1/2112* (2013.01); *H04N 2101/00* (2013.01)
USPC .................. 348/231.3; 348/222.1; 348/231.6; 348/333.02

(58) Field of Classification Search
CPC .................................................. H04N 5/23225
USPC ...................................................... 348/231.3
See application file for complete search history.

(56) References Cited

U.S. PATENT DOCUMENTS

| | | | | |
|---|---|---|---|---|
| 5,909,551 | A  * | 6/1999 | Tahara et al. ................. | 709/231 |
| 6,950,200 | B1 * | 9/2005 | Yamada et al. .............. | 358/1.13 |
| 7,327,935 | B2 * | 2/2008 | Yamasaki et al. ............. | 386/252 |
| 7,545,414 | B2 * | 6/2009 | Nagata ........................ | 348/231.2 |
| 8,127,343 | B2 * | 2/2012 | Asai ................................. | 726/5 |

(Continued)

FOREIGN PATENT DOCUMENTS

| | | |
|---|---|---|
| JP | 63-293664 | 11/1988 |
| JP | 11-266430 | 9/1999 |
| JP | 2000-013720 | 1/2000 |

(Continued)

OTHER PUBLICATIONS

Japanese Office Action issued Apr. 1, 2014 in Japanese Application No. 2010-173405, 1 page (Japanese language only).

*Primary Examiner* — Ngoc-Yen Vu
(74) *Attorney, Agent, or Firm* — Oblon, Spivak, McClelland, Maier & Neustadt, L.L.P.

(57) ABSTRACT

An imaging apparatus that includes an image capturing unit that captures image data, a memory that stores the image data and a password for accessing the stored image data, an interface that receives an input requesting access to the stored image data and an input password, and a processor that compares the input password to the stored password and allow access to the stored image data when the input password matches the stored password, and deletes the password and the image data when the input password does not match the stored password.

20 Claims, 8 Drawing Sheets

(56) References Cited

U.S. PATENT DOCUMENTS

| | | |
|---|---|---|
| 8,482,633 B2 * | 7/2013 | Lee .............................. 348/231.3 |
| 8,635,688 B2 * | 1/2014 | Ishiguro et al. ................. 726/19 |
| 2004/0145660 A1 * | 7/2004 | Kusaka ...................... 348/211.2 |
| 2005/0131923 A1 * | 6/2005 | Noguchi et al. .............. 707/100 |
| 2005/0185067 A1 * | 8/2005 | Estakhri et al. ............ 348/231.9 |
| 2008/0066162 A1 * | 3/2008 | Saito ................................. 726/4 |
| 2010/0002878 A1 * | 1/2010 | Foong ............................ 380/54 |

FOREIGN PATENT DOCUMENTS

| | | |
|---|---|---|
| JP | 2000-125237 | 4/2000 |
| JP | 2004-179709 | 6/2004 |
| JP | 2005-130272 | 5/2005 |
| JP | 2008-077273 | 4/2008 |

* cited by examiner

IMAGING APPARATUS AND IMAGE CAPTURING METHOD FOR INCREASING SECURITY OF A CAPTURED IMAGE FILE

CROSS REFERENCE TO RELATED APPLICATIONS

This application claims the benefit of priority under 35 U.S.C. §119 to Japanese Patent Application No. 2010-173405, filed Aug. 2, 2010, the entire contents of which is incorporated herein by reference.

BACKGROUND OF THE DISCLOSURE

1. Field of the Disclosure

The present disclosure relates to an imaging apparatus and an image capturing method.

2. Description of the Related Art

Digital cameras are typically configured to store captured image files into a built-in memory, for example hard-disk of the digital camera, or to an external memory, for example memory card coupled to the digital camera. The stored image files may then be accessed and played freely by a photographer, who is typically the owner of the camera.

However, a person who is not the owner of the camera (i.e., a malicious user) is also able to operate the digital camera, and access the memory and to freely play the stored image files. This causes a problem because potentially confidential information may be leaked to the malicious user.

Previous efforts have been made to prevent such malicious access by password protecting the image files, authenticating a user's identity before the user is permitted to access the stored image files, or requiring a password to turn on the power of the digital camera. These configurations can ensure security protection and safety of captured image files.

According to the above mentioned configurations, however, when a user forgets the password, the camera typically must be sent to a customer support center in order to unlock the camera and reset the password. Therefore, a user may be able to ensure security and safety of captured image files, but the user can not easily access the camera when the password is misplaced or forgotten.

SUMMARY

According to an aspect of the present disclosure, there is provided an image apparatus and image capturing method which can ensure security protection and safety of captured image file, and easily delete a password.

In particular, one embodiment of the present disclosure provides an imaging apparatus that includes an image capturing unit that captures image data, a memory that stores the image data and a password for accessing the stored image data, an interface that receives an input requesting access to the stored image data and an input password, and a processor that compares the input password to the stored password and allow access to the stored image data when the input password matches the stored password, and deletes the password and the image data when the input password does not match the stored password.

Also, one embodiment of the present disclosure provides an method performed by an imaging apparatus, the method including capturing, by an image capturing unit of the imaging apparatus, image data, storing, at a memory of the imaging apparatus, the image data and a password for accessing the stored image data, receiving, at an interface of the imaging apparatus, an input requesting access to the stored image data and an input password, comparing, by a processor of the imaging apparatus, the input password to the stored password, allowing, by the processor, access to the stored image data when the input password matches the stored password, and deleting, by the processor, the password and the image data when the input password does not match the stored password.

Also, one embodiment of the present disclosure provides a non-transitory computer-readable medium including computer program instructions, which when executed by an imaging apparatus, cause the imaging apparatus to perform a method comprising capturing image data, storing the image data and a password for accessing the stored image data, receiving an input requesting access to the stored image data and an input password, comparing the input password to the stored password, allowing access to the stored image data when the input password matches the stored password, and deleting the password and the image data when the input password does not match the stored password.

DETAILED DESCRIPTION

Hereinafter, an embodiment of an imaging apparatus and an image capturing method according to the present disclosure will be described with reference to the drawings.

Figure 1A:
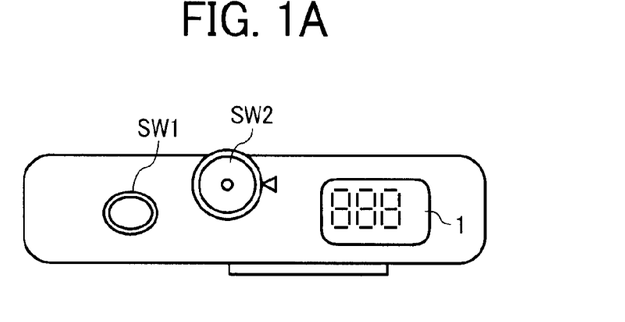
FIGS. 1A to 1C illustrate schematic diagrams showing the appearance of a digital camera.
Figure 1B:
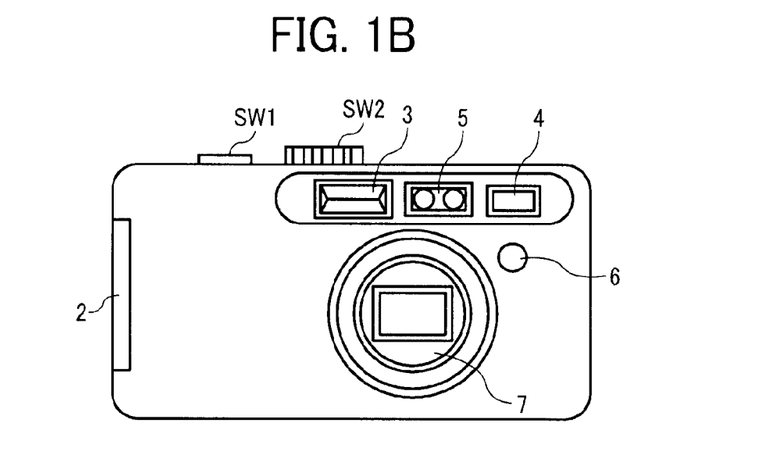
Figure 1C:
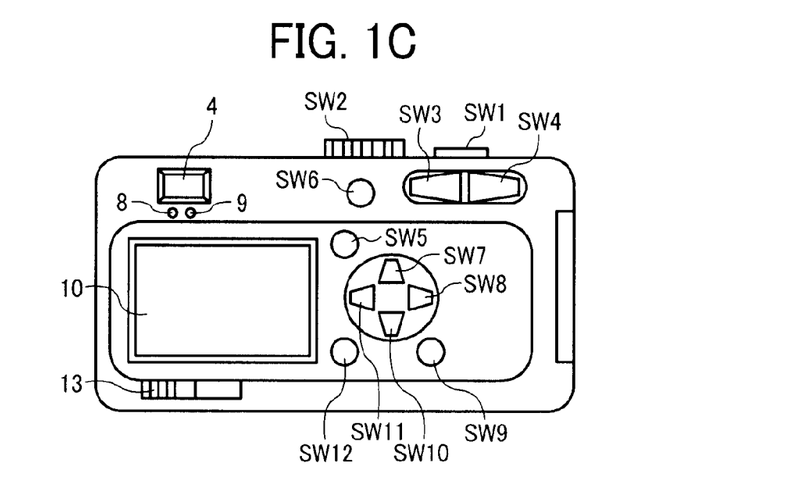

FIGS. 1A to 1C illustrate external appearances of a digital camera which is an example of an imaging apparatus. FIG. 1A provides a plan view, FIG. 1B provides a front view and FIG. 1C provides a back view.

Referring to FIG. 1A, a top face of the digital camera includes a release shutter SW1, a mode dial SW2 and a sub liquid crystal display 1 (sub-LCD).

Referring to FIG. 1B, a front face of the digital camera includes a strobe light emitter 3, an optical finder 4, a ranging unit 5, a remote control receiver 6 and a lens barrel unit 7. One side face of the digital camera includes a lid 2 of a memory card room and a battery room.

Referring to FIG. 1C, a back side of the digital camera includes an eyepiece section of the optical finder 4, an autofocus (AF) light emitting diode 8 (AF LED), a strobe LED 9, an LCD 10, a power switch 13, a zoom switch SW3 in a wide angle direction, a zoom switch SW4 in a telephoto direction, a switch SW5 for setting and releasing a self timer, a switch SW6 for playing, a switch SW7 for setting strobe light and up movement of a cursor, a switch SW8 for right movement of a cursor, a display switch SW9, a switch SW10 for macro and down movement of a cursor, a switch SW11 for confirming an image and left movement of a cursor and an OK switch SW12.

Figure 2:
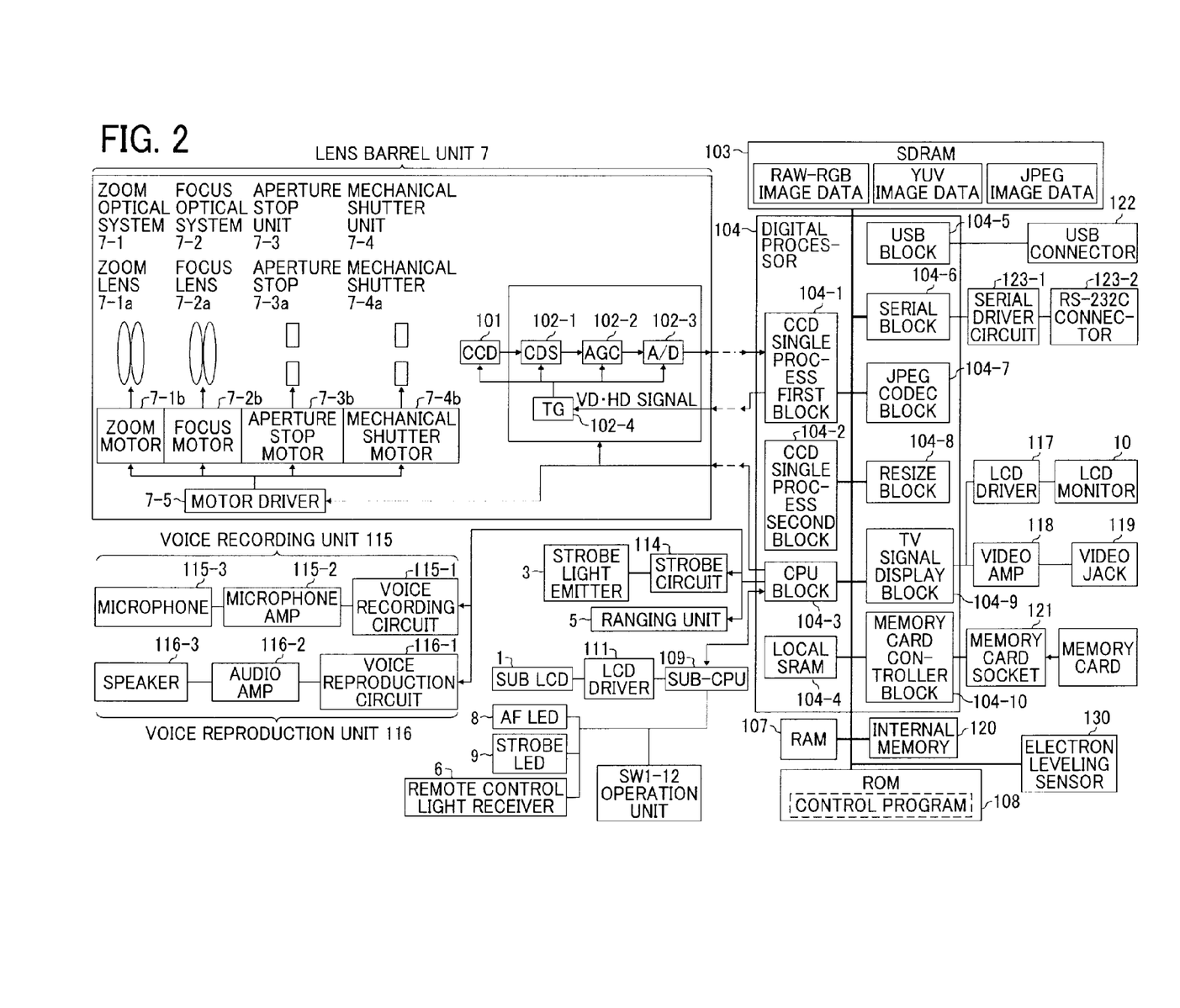
FIG. 2 illustrates a block diagram showing the hardware configuration of a digital camera.

FIG. 2 illustrates a block diagram showing the hardware configuration of a digital camera which is an example of an imaging apparatus.

Referring to FIG. 2, the lens barrel unit 7 includes a zoom optical system 7-1 having a zoom lens 7-1a and a zoom motor 7-1b, a focus optical system 7-2 having a focus lens 7-2a and a focus motor 7-2b, an aperture stop unit 7-3 having an aperture stop 7-3a and an aperture stop motor 7-3b, and a mechanical shutter unit 7-4 having a mechanical shutter 7-4a, a mechanical shutter motor 7-4b and a motor driver 7-5. The zoom optical system 7-1, the focus optical system 7-2, the aperture stop unit 7-3 and the mechanical shutter unit 7-4 are driven by a zoom motor 7-1b, a focus motor 7-2b as a focus lens moving section, an aperture stop motor 7-3b and a mechanical shutter motor 7-4b, respectively. These zoom motor 7-1b, the focus motor 7-2b, the aperture stop motor 7-3b and the mechanical shutter motor 7-4b are driven by the motor driver 7-5.

Various operations (processes) of the digital camera are controlled by a digital signal processor 104 (DSP) configured as an IC (integrated circuit) or the like. The DSP 104 includes a CCD (charge-coupled device) signal process first block 104-1, a CCD signal process second block 104-2, a CPU (central processing unit) block 104-3, a local SRAM (static random access memory) 104-4, an USB (universal serial bus) block 104-5, a serial block 104-6, a JPEG codec (CODEC) block 104-7, a resize (RESIZE) block 104-8, a TV signal display block 104-9 and a memory card controller block 104-10. Each block is connected via a bus line.

The zoom lens 7-1a and the focus lens 7-2a of the lens barrel unit 7 constitutes an imaging lens for focusing a subject optical image on a imaging face of the CCD 101 which is an imaging element. The CCD 101 converts the subject optical image into electrical image signals, and outputs the electric signals to an F/E-IC (front end IC) 102. The E/F-IC 102 includes a CDS (correlation double sampling section) 102-1, an AGC (automatic gain controller) 102-2, an A/D (analogue digital) converter 102-3 and a TG (timing generator) 102-4. The E/F-IC 102 performs a predetermined process to each image signal, converts the image signals into digital signals, and outputs the digital signals to the CCD signal process first block 104-1 of the DSP 104. These signal processing operations are controlled via the TG 102-4 by VD-HD (vertical driving and horizontal driving) signals output from the CCD signal process first block 104-1 of the DSP 104.

The lens barrel unit 7 is removably attached to the body of the digital camera and lens barrel units of various zoom factor or CCD-size are available. The motor driver 7-5 is controlled by the CPU block 104-3 of the DSP 104 based on the operation input of the remote control receiver 6 or the operation unit (SW1 to SW12).

The external portion of the DSP 104 includes a SDRAM (synchronous random access memory) 103 which stores RAW-RGB image data, YUV image data and JPEG image data, a RAM 107, an internal memory 120 and a ROM 108 in which control programs are stored. These are connected to the DSP 104 via bus lines.

The ROM 108 includes control programs or control parameters written in program codes readable and executable by the CPU block 104-3. When the digital camera is powered on, the programs are loaded into the RAM 107 and components of the digital camera are controlled by the CPU block 104-3 according to the programs. Furthermore, the data concerning the programs are temporarily stored in the RAM 107 or local SRAM 104-4. If a rewritable flash ROM is used in place of the ROM 108, the digital camera can easily be upgraded by updating or modifying existing programs or installing new programs.

The SDRAM 103 temporarily stores image data when image data is processed by the DSP 104. The stored image data is, for example, RAW-RGB image data taken from the CCD 101 via the E/F-IC 102 that performs white balance and gamma processing by the CCD signal process first block 104-1, YUV image data which was processed transformation of brightness data or color difference by the CCD signal process second block 104-2 and JPEG image data which was compressed in the JPEG file by the JPEG codec block 104-7.

A memory card socket 121 may be configured to be attached to a detachable memory card, a LAN card, a wireless LAN card and/or a Bluetooth card.

The internal memory 120 can store captured image files even if the memory card socket 121 is not attached to a memory card.

In addition, the internal memory 120 can store a variety of information, for example a strobe mode setting, image quality setting and imaging size setting. If the digital camera is powered off, the internal memory 120 can load the information on the RAM 107 when the digital camera is powered on again.

An LCD driver 117 is a circuit which drives the LCD 10, and transforms video signals output by the TV signal display block 104-9 into signals for displaying images on the LCD 10.

The LCD 10 allows a user to monitor the state of a subject before photographing, and displays image files stored in the memory card or the internal memory 120.

A video AMP (amplifier) 118 amplifies the video signals output by the TV signal display block 104-9.

A video jack 119 is a jack which connects to an external display, for example a TV (television).

A USB connector 122 is a connector which connects to an external device via a USB connection, for example a PC (personal computer).

A serial driver circuit 123-1 is a circuit that transforms a voltage of signals output by the serial block 104-6 to communicate with the external device in a serial communication method.

An RS-232C connector 123-2 is a connector that communicates with an external device in a serial communication method, for example a PC (personal computer).

A sub-CPU 109 is a CPU having ROM and RAM on one-chip microcomputer, which outputs the output signals of the operation unit (SW1 to SW12) or the remote control receiver 6, as operation information of a user, to the CPU block 104-3, transforms the state of the digital camera output by the CPU block 104-3 to a control signals of the sub-LCD 1, the AF LED 8 and the strobe LED 9, and outputs the control signals therein.

The sub-LCD 1 is a display that displays the number of photographs taken. A LCD driver 111 drives the sub-LCD 1 using signals output from the sub-CPU 109.

The AF LED 8 is a LED that displays a focusing state. The strobe LED 9 is an LED that displays the charging state of the strobe. Also, the AF LED 8 and strobe LED 9 can be adapted to other uses, for example to display an indication that the memory card is being accessed.

The operation unit (SW1 to SW12) includes members to be operated by a user. The remote control receiver 6 receives the signals of a remote control operated by a user.

A voice recording unit 115 includes a microphone 115-3, a microphone amplifier 115-2, and a voice recording circuit 115-1.

A voice reproduction unit 116 includes a voice reproduction circuit 116-1 that transforms recorded voice signals into signals configured to be output by a speaker, an audio amplifier 116-2 that amplifies the transformed voice signals, and a speaker 116-3 that outputs the amplified voice signals.

A electron leveling sensor 130 detects the slope-angle of horizontal direction of the digital camera.

The First Embodiment

The specific example of a password-lock-mode of the digital camera will hereinafter be described. Here, the password-lock-mode is mode that prevents an image file from being played without inputting a password. Also, in the first, second and third embodiments, the recording medium is, for example, the internal memory 120 included in the digital camera. Furthermore, in the recording medium, the reflected light of a subject is input to the CCD 101 via the lens barrel unit 7, converted to photoelectric image data, output as an image data, and stored as an image file. The image file may then be displayed on the LCD 10.

Next, setting a password of the digital camera will be described.

Figure 3:
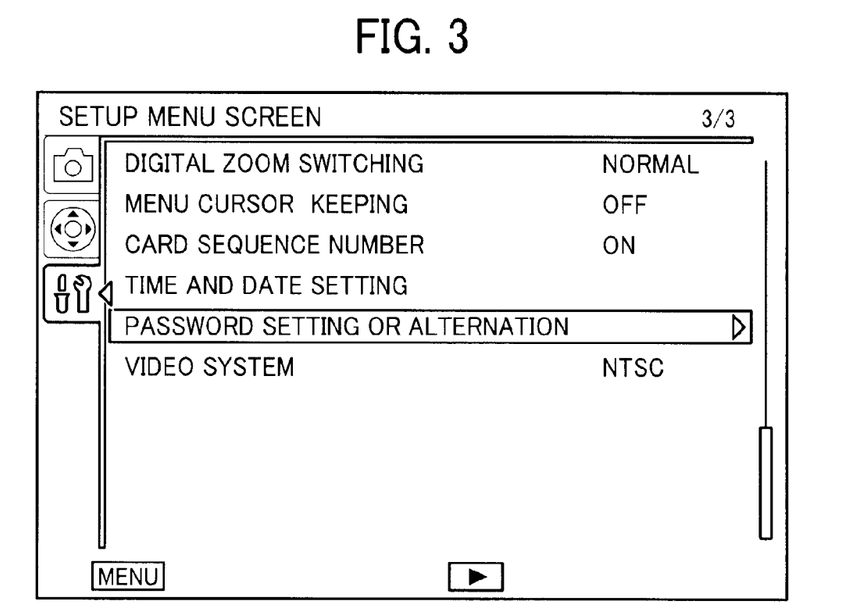
FIG. 3 illustrates a diagram showing an example of a setup menu screen of a digital camera.

FIG. 3 shows an example of a setup menu screen of a digital camera, which is an example of an imaging apparatus. When a user operates the operation unit (SW1 to SW12) of the digital camera, the setup menu is displayed. If the menu item corresponding to a password setting or modification is selected, a password setting screen is displayed.

Figure 4:
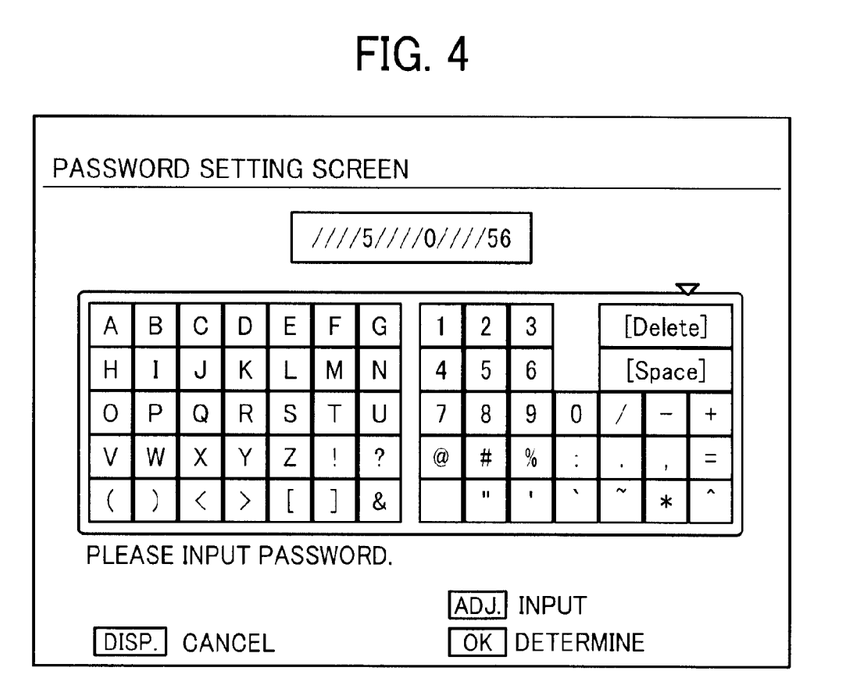
FIG. 4 illustrates a diagram showing an example of a password setting screen of a digital camera.

FIG. 4 illustrates a diagram showing an example of the password setting screen. The user operates the operation unit (SW1 to SW12) of the digital camera to enter information on the password setting screen to set or modify a password. The password is stored in the internal memory 120 of the digital camera.

Next, the operation of a digital camera in password-locked-mode will be described.

Figure 5:
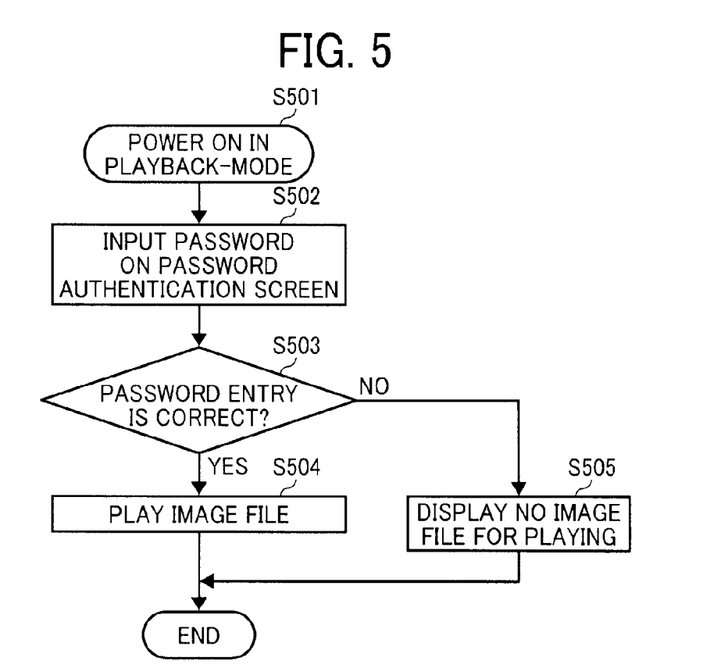
FIG. 5 is a flowchart illustrating an example of the operation of a digital camera in password-locked-mode.
Figure 6:
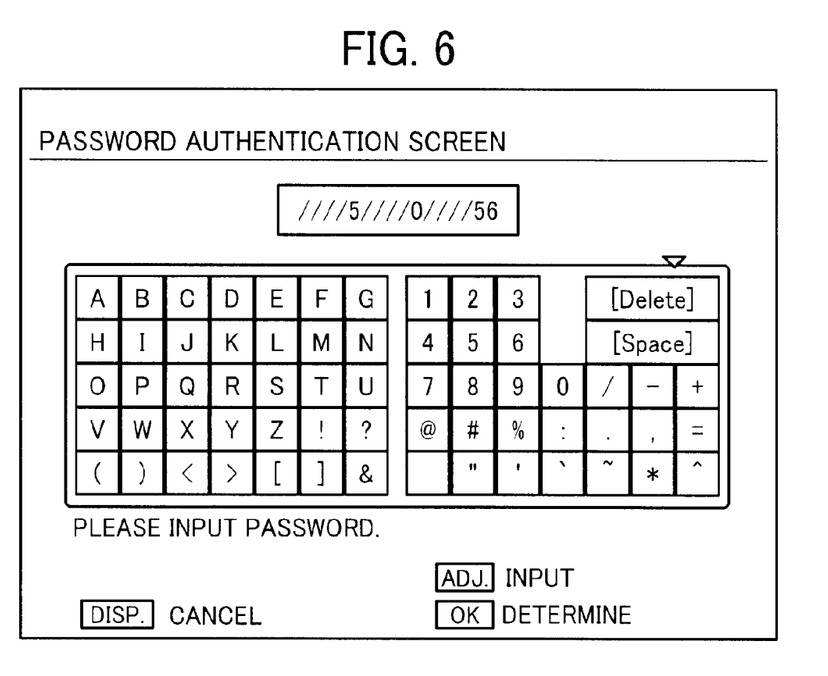
FIG. 6 illustrates a diagram showing an example of a password authentication screen of a digital camera.

FIG. 5 is a flowchart illustrating an example of the operation of a digital camera in password-locked-mode. FIG. 6 shows an example of a password authentication screen of the digital camera.

Hereinafter, it will be described in case the password-locked-mode is set.

When the digital camera is powered on in playback-mode (S501), the password authentication screen of the digital camera is displayed. A user operates the operation unit (SW1 to SW12) while the password authentication screen is displayed to input a password (S502). The CPU block 104-3 determines whether the password entry is correct (S503), and an image file may be played if the password entry is correct (S504). In contrast, the LCD 10 displays no image file for playing if the password entry is not correct (S505).

Figure 7:
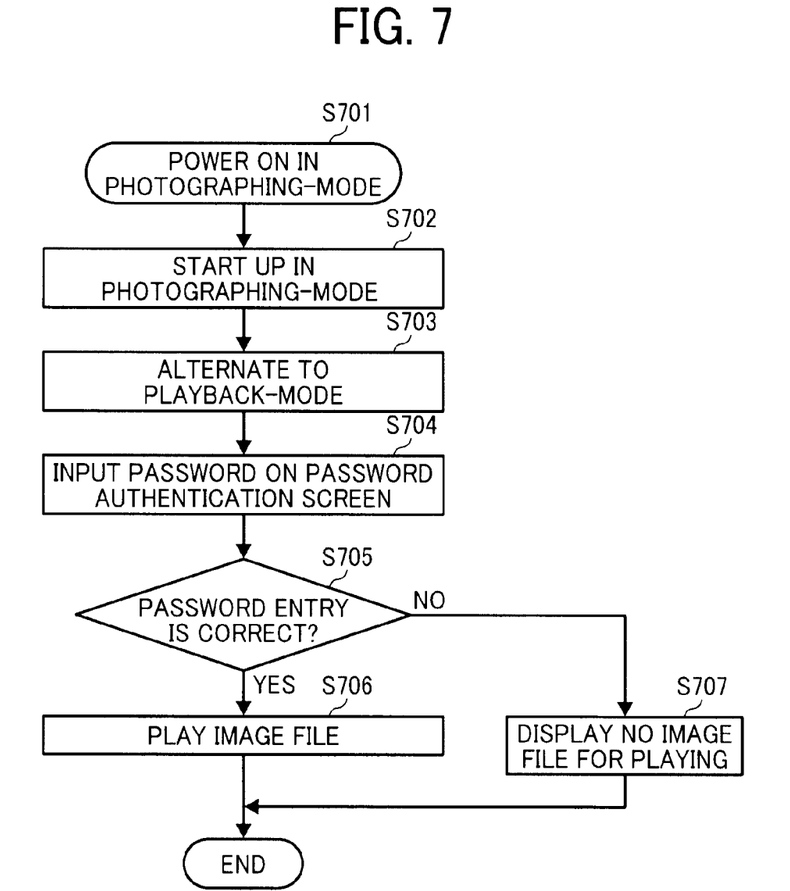
FIG. 7 is a flowchart illustrating the other example of the operation of a digital camera in password-locked-mode.

FIG. 7 is a flowchart illustrating the other example of the operation of a digital camera in password-locked-mode. When the digital camera is powered on in photographing-mode (S701), the digital camera starts up in photographing-mode (S702). When the digital camera is switched to playback-mode (S703), the password authentication screen is displayed. The following steps (S704 to S707) are then the same as the steps (S502 to S505) performed during playback-mode. Also, when the digital camera is powered on in photographing-mode, password authentication is not necessary until the mode of the digital camera is switched to playback-mode. Therefore, a user can photograph even if the digital camera starts up in password-lock-mode without having to enter a password.

Figure 8:
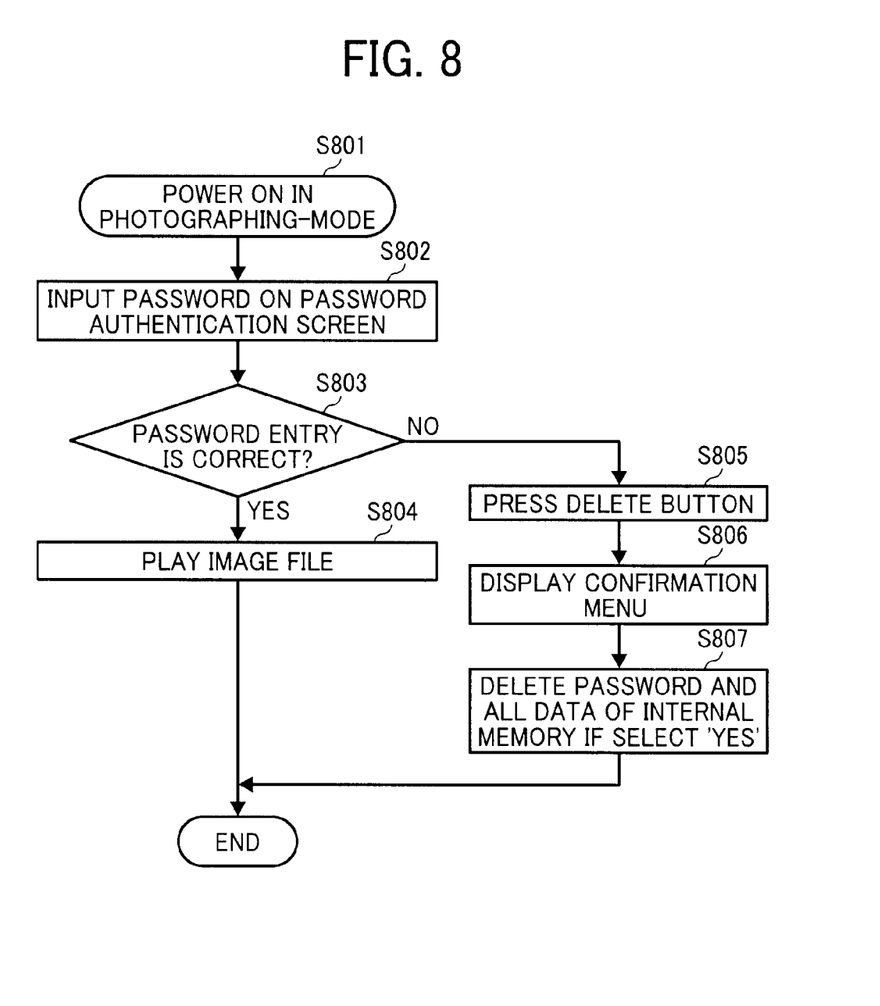
FIG. 8 is a flowchart illustrating the operation of the password deletion of a digital camera in password-locked-mode of the first embodiment.
Figure 9:
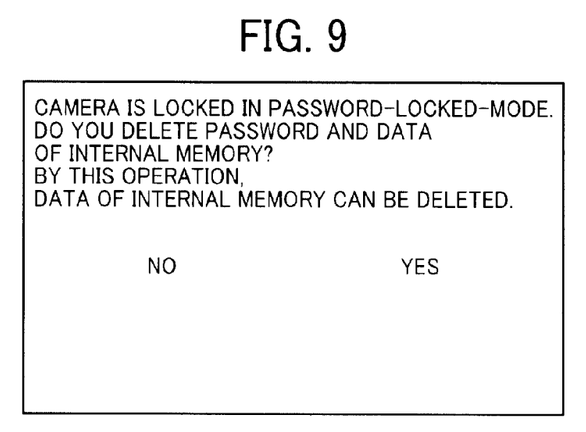
FIG. 9 illustrates a diagram showing an example of a password-deletion confirmation screen of a digital camera.

FIG. 8 is a flowchart illustrating the operation of password deletion in password-locked-mode. When the digital camera is powered on in playback-mode (S801), the password authentication screen of the digital camera is displayed. The user may then operate the operation unit (SW1 to SW12) to input a password on the password authentication screen (S802). The CPU block 104-3 determines whether the password entry is correct (S803). An image file may then be viewed if the password entry is correct (S804). In contrast, the LCD 10 displays the password-deletion confirmation screen (S806) for deleting the password and data (image files) of the internal memory 120 if the password entry is not correct and a delete button is pressed (S805). FIG. 9 shows an example of a password-deletion confirmation screen. Here, if a user selects 'YES' on the password-deletion confirmation screen, the password and all data (image files) of the internal memory 120 are deleted (S807).

According to the above first embodiment of password-locked-mode, when a user forgets the password and the password is deleted by the user, the data (image files) of the internal memory 120 can also be deleted with the deletion of password. Therefore, playing of the image files may be prevented without the input of a password, and the password is also deleted or reset with the elimination of image files.

The Second Embodiment

Figure 10:
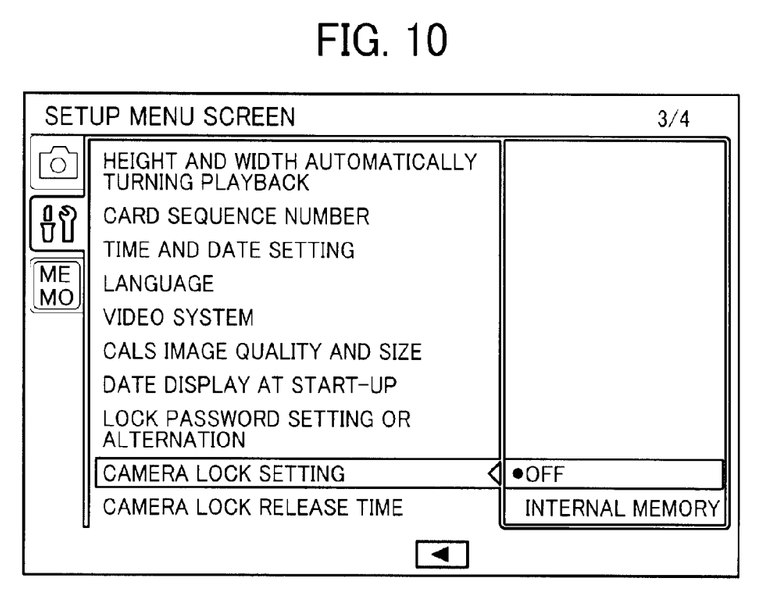
FIG. 10 illustrates a diagram showing the other example of a setup menu screen of a digital camera.

FIG. 10 illustrates a diagram showing another example of a setup menu screen of a digital camera. The setup menu screen, shown in FIG. 10, is displayed upon receiving an input at the operation unit (SW1 to SW12) of the digital camera. If a user selects the 'camera lock setting' menu item, the LCD 10 displays options to turn the internal-memory-lock on or off. If the user selects 'internal-memory-lock is on', the digital camera goes into password-lock-mode. At this time, a sequence number corresponding to the last captured image file before the digital camera was set into password-lock mode is stored in the internal memory 120, in other words, a sequence number corresponding to the last captured photograph prior to the digital camera being set into password-lock mode is stored in the internal memory 120.

For example, the sequence number of the most recent image file from the image files stored in the internal memory 120 is stored in the internal memory 120. When the digital camera goes into password-lock-mode, for example, the user may have already taken 10 photographs. In this case, the sequence number of 10 is stored in the internal memory 120. Thus, the sequence number may correspond to the order in which images have been captured and stored in memory, and may also correspond to the order in which the image files are played back by a user.

Figure 11:
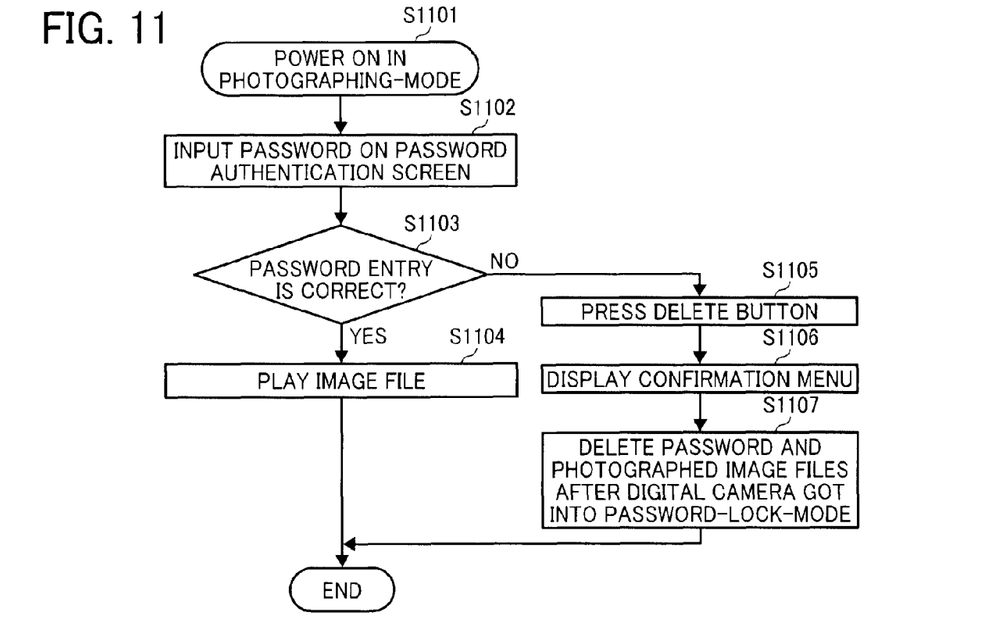
FIG. 11 is a flowchart illustrating the operation of the password deletion of a digital camera in password-locked-mode of the second embodiment.

FIG. 11 is a flowchart illustrating the operation of the password deletion of a digital camera in password-locked-mode according to the second embodiment. When the digital camera is powered on in playback-mode (S1101), the password authentication screen of the digital camera is displayed. The user may then operate the operation unit (SW1 to SW12)

of the digital camera to input a password on the password authentication screen (S1102). The CPU block 104-3 determines whether the password entry is correct (S1103). If the password is correct, an image file may be played (S1104). If the password is not correct and a delete button is pressed (S1105), the LCD 10 displays the password-deletion confirmation screen (S1106), shown in FIG. 9, which deletes password and data of the internal memory 120. If a user selects 'YES' on the password-deletion confirmation screen, the image files stored in the internal memory 120 from when the digital camera was set to password-lock-mode to when the delete button was pressed are deleted, and the password is deleted (S1107). Otherwise stated, image files that were stored after the digital camera was set to password password-lock mode are deleted along with the password.

According to the second embodiment of password-locked-mode, when a user forgets the password, if the user deletes password, image files stored in the internal memory 120, which were photographed after the digital camera was set to password-lock-mode can also be deleted with the elimination of password. Therefore, image files stored in the internal memory 120 can be prevented from being played without inputting password, and the password can be deleted or reset the deletion of image files which were photographed after the digital camera was set to password-lock-mod.

The Third Embodiment

The setup menu screen, shown in FIG. 10, is displayed upon receiving an input at the operation unit (SW1 to SW12) of the digital camera. If a user selects the 'camera lock setting' menu item, the LCD 10 displays options for turning the internal-memory-lock on or off. If the user selects 'internal-memory-lock is on', the digital camera is set to password-lock-mode. At this time, the sequence number corresponding to the last captured image file before the digital camera was set into password-lock mode is stored in the internal memory 120, in other words, a sequence number corresponding to the last captured photograph prior to the digital camera being set into password-lock mode is stored in the internal memory 120.

For example, the sequence number of the most recent image file from the image files stored in the internal memory 120, in is stored in the internal memory 120. When the digital camera goes into password-lock-mode, for example, the user may have already taken 10 photographs. In this case, the sequence number of 10 is stored in the internal memory 120. In other words, the sequence number corresponds to the order in which images have been captured and stored in memory, and may also correspond to the order in which the image files are played back by a user.

Upon receiving an input at the operation unit (SW1 to SW12) of the digital camera, the setup menu screen, shown in FIG. 3, is displayed. If the 'password setting or change' menu item is selected, the password setting screen, shown in FIG. 4, is displayed. When the user operates the operation unit (SW1 to SW12) of the digital camera on the password setting screen, a current password can be changed. The password is stored in the internal memory 120, and is held even if the digital camera is powered off. At this time, the sequence number corresponding to the last captured image file before the password was changed is stored in the internal memory 120, in other words, a sequence number corresponding to the last captured photograph prior to changing the password is stored in the internal memory 120.

When the password is changed, for example, the user may have already taken 20 photographs. In this case, the sequence number of 20 is stored in the internal memory 120, along with the already stored sequence number of 10 corresponding to last image file stored before the digital camera was set into password-lock-mode.

Figure 12:
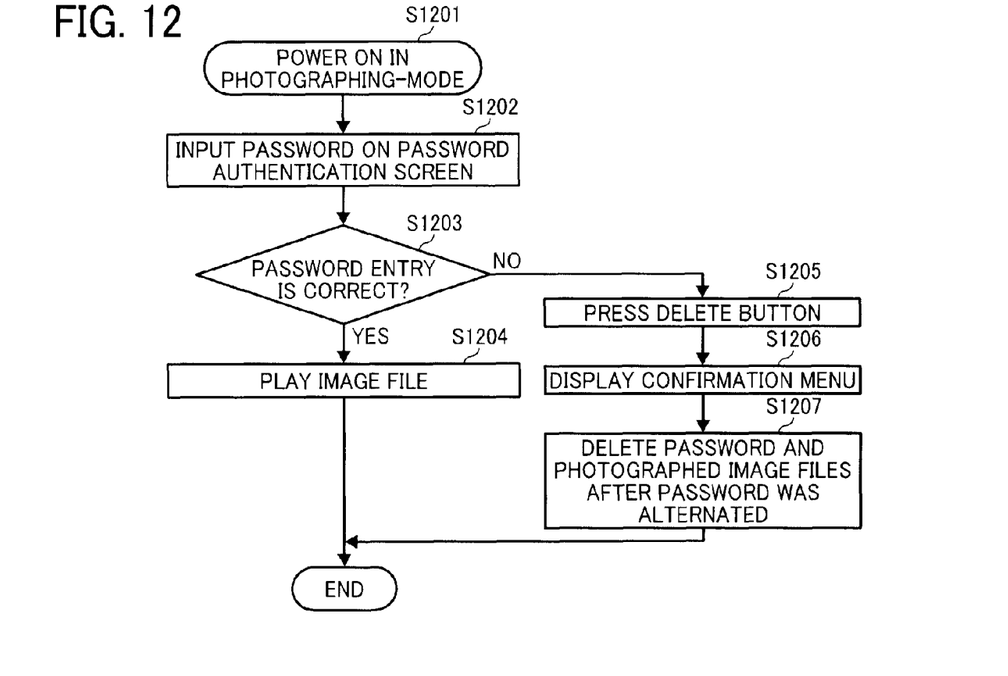
FIG. 12 is a flowchart illustrating the operation of the password deletion of a digital camera in password-locked-mode of the third embodiment.

FIG. 12 is a flowchart illustrating the operation of the password deletion of a digital camera in password-locked-mode of the third embodiment. When the digital camera is powered on in playback-mode (S1201), the password authentication screen of the digital camera is displayed. A user may then operate the operation unit (SW1 to SW12) of the digital camera to input a password to the password authentication screen (S1202). The CPU block 104-3 determines whether the password entry is correct (S1203). If the entered password is correct, an image file may be played (S1204). In contrast, if the entered password is not correct and a delete button is pressed (S1205), the LCD 10 displays the password-deletion confirmation screen (S1206), shown in FIG. 9. If a user selects 'YES' on the password-deletion confirmation screen, the image files stored in the internal memory 120 from when the password was changed to when the delete button was pressed are deleted along with the password (S1207). For example, image files having a sequence number greater than the number stored in the internal memory 120 when the password was changed are deleted along with the password.

For example, when the password was changed, the user may have already taken 20 photographs. In this case, the sequence number of 20 is stored in the internal memory 120. Therefore, the image files having a sequence number greater than or equal to 21 are deleted along with the password.

According to the above third embodiment of password-locked-mode, when a user forgets and deletes the password, image files of the internal memory 120 which were photographed after a current password was changed can also be deleted with the deletion of password. Therefore, playing of the image file stored to the internal memory 120 can be prevented without a correct password, and the password may be deleted or reset with the elimination of image files which were photographed after a current password was changed.

The above mentioned, the present disclosure provides an image apparatus and image capturing method which can ensure security protection and safety of captured image file, and delete password easily.

Although the embodiments of the present disclosure have been described above, the present disclosure is not limited thereto. It should be appreciated that variations may be made in the embodiments described by persons skilled in the art without departing from the scope of the present disclosure.

What is claimed is:

1. An imaging apparatus, comprising:
    an image capturing unit configured to capture image data;
    a memory configured to store the image data and a password for accessing the stored image data;
    an interface configured to receive an input requesting access to the stored image data and an input password;
    a processor configured to compare the input password to the stored password and allow access to the stored image data when the input password matches the stored password, and delete the password and the image data when the input password does not match the stored password.

2. The imaging apparatus of claim 1, further comprising:
    a display configured to display a password-deletion confirmation screen when the input password does not match the stored password.

3. The imaging apparatus of claim 2, wherein the interface is configured to receive an input requesting that the password be deleted when the password-deletion confirmation screen is displayed.

4. The imaging apparatus of claim 3, wherein the processor is configured to delete the password and the image data upon receiving the input requesting that the password be deleted.

5. The imaging apparatus of claim 1, wherein the interface is configured to receive an input setting the imaging apparatus into password-lock mode.

6. The imaging apparatus of claim 5, wherein the processor is configured to delete only image files stored after the imaging apparatus was set into password-lock mode when the password is deleted.

7. The imaging apparatus of claim 5, wherein the processor is configured to store a sequence number corresponding to an image file that was last recorded before the imaging apparatus was set into password-lock mode.

8. The imaging apparatus of claim 7, wherein the processor is configured to delete only image files having a sequence number greater than the stored sequence number when the password is deleted.

9. The imaging apparatus of claim 1, wherein the interface is configured to receive an input changing the password.

10. The imaging apparatus of claim 9, wherein the processor is configured to delete only image files stored after the password was changed when the password is deleted.

11. The imaging apparatus of claim 9, wherein the processor is configured to store a sequence number corresponding to an image file that was last recorded before the password was changed.

12. The imaging apparatus of claim 11, wherein the processor is configured to delete only image files having a sequence number greater than the stored sequence number when the password is deleted.

13. An image processing method performed by an imaging apparatus, the method comprising:
   capturing, by an image capturing unit of the imaging apparatus, image data;
   storing, at a memory of the imaging apparatus, the image data and a password for accessing the stored image data;
   receiving, at an interface of the imaging apparatus, an input requesting access to the stored image data and an input password;
   comparing, by a processor of the imaging apparatus, the input password to the stored password;
   allowing, by the processor, access to the stored image data when the input password matches the stored password; and
   deleting, by the processor, the password and the image data when the input password does not match the stored password.

14. The method of claim 13, further comprising:
   displaying, by a display of the imaging apparatus, a password-deletion confirmation screen when the input password does not match the stored password.

15. The method of claim 14, further comprising:
   receiving, at the interface, an input requesting that the password be deleted when the password-deletion confirmation screen is displayed; and
   deleting, by the processor, the password and the image data upon receiving the input requesting that the password be deleted.

16. The method of claim 13, further comprising:
   receiving, at the interface, an input setting the imaging apparatus into password-lock mode.

17. The method of claim 16, wherein the deleting includes deleting only image files stored after the imaging apparatus was set into password-lock mode when the password is deleted.

18. The method of claim 13, further comprising:
   receiving, at the interface, an input changing the password.

19. The method of claim 18, wherein the deleting includes deleting only image files stored after the password was changed when the password is deleted.

20. A non-transitory computer-readable medium including computer program instructions, which when executed by an imaging apparatus, cause the imaging apparatus to perform a method comprising:
   capturing image data;
   storing the image data and a password for accessing the stored image data;
   receiving an input requesting access to the stored image data and an input password;
   comparing the input password to the stored password;
   allowing access to the stored image data when the input password matches the stored password; and
   deleting the password and the image data when the input password does not match the stored password.

* * * * *